(12) United States Patent
Larson et al.

(10) Patent No.: US 9,242,730 B2
(45) Date of Patent: Jan. 26, 2016

(54) SEQUENTIAL LATCH FOR PALLETIZED CARGO

(71) Applicant: GOODRICH CORPORATION, Charlotte, NC (US)

(72) Inventors: Wallace H. Larson, Jamestown, ND (US); James R. Brown, Jamestown, ND (US)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 14/640,136

(22) Filed: Mar. 6, 2015

(65) Prior Publication Data
US 2015/0329206 A1 Nov. 19, 2015

Related U.S. Application Data

(62) Division of application No. 13/676,307, filed on Nov. 14, 2012, now Pat. No. 9,079,665.

(60) Provisional application No. 61/661,273, filed on Jun. 18, 2012.

(51) Int. Cl.
*B60P 7/08* (2006.01)
*B64D 9/00* (2006.01)

(52) U.S. Cl.
CPC .. *B64D 9/003* (2013.01); *B60P 7/08* (2013.01)

(58) Field of Classification Search
CPC .............. B60P 7/13; B60P 7/08; B64D 9/003
USPC ........... 410/77, 78, 79, 80, 69, 46, 92, 94, 90, 410/91; 244/118.1, 137.1; 248/503; 414/536
See application file for complete search history.

(56) References Cited

U.S. PATENT DOCUMENTS 5,486,077 A * 1/1996 Nutting ........................... 410/69

* cited by examiner

*Primary Examiner* — Stephen Gordon
(74) *Attorney, Agent, or Firm* — Cantor Colburn LLP

(57) ABSTRACT

An aircraft cargo handling system has a pair of load restraining rail assemblies, each of which has a shaft assembly running substantially parallel to the longitudinal axis of the aircraft. The shaft assembly has a plurality of lock pawls, each of which comprises a body having a cylindrical pallet-engaging surface. The pallet engaging surfaces of the lock pawls have increasing included angles at stations moving toward the front of the aircraft (or vice versa). This enables the pallets to be locked in place sequentially by rotating the shall assembly a predetermined angular rotation each time a pallet is loaded. Unloading of the aircraft is carried out in the reverse order, by rotating the shaft assembly in the opposite direction in steps to unlock each pallet individually as the aircraft is unloaded.

2 Claims, 4 Drawing Sheets

SEQUENTIAL LATCH FOR PALLETIZED CARGO

CROSS REFERENCE TO RELATED APPLICATIONS

This application is a divisional application of the legally related U.S. Ser. No. 13/676,307, filed Nov. 14, 2012, and now issued as U.S. Pat. No. 9,079,665, which claims priority of provisional application U.S. Ser. No. 61/661,273, filed Jun. 18, 2012, the contents of which are incorporated by reference herein in their entireties.

BACKGROUND OF THE INVENTION

This invention relates generally to aircraft interior equipment and, in particular, to aircraft cargo handling systems.

In 1957, the United States Air Force adopted a standardized system to facilitate cargo handling aboard military airlift aircraft. The Air Force cargo handling system is known as "Materials Handling Support System 463L" or simply "463L System." A central component of the 463L system is the HCU-6/E pallet, sometimes referred to simply as the "463L pallet," which is a standardized pallet, 108 inches wide by 88 inches long by 2¾ inches thick, typically made of aluminum plates top and bottom with a balsa wood core, framed on all sides by aluminum rails. The rails have 22 steel tie-down rings attached so that there are six rings on each long side and five rings on each short side. The rails also have notches approximately 1¼ inches deep by 2¾ inches wide evenly spaced approximately every 10 inches along all sides.

The aircraft cargo handling system itself typically comprises a roller conveyor system mounted to the floor the aircraft, which enables the pallets to be moved easily in and out of the aircraft cargo bay. A plurality of guide rails are mounted to the aircraft floor with their long axes oriented parallel to the longitudinal axis of the aircraft. The guide rails are spaced apart by a distance of slightly more than 108 inches or 88 inches so that a 463L pallet can be slid into the gap between the guide rails with the long edge of the pallet either longitudinal or transverse to the longitudinal axis of the aircraft, depending on the aircraft configuration. The guide rails themselves are typically inverted L-shaped or T-shaped in cross-section so that they provide both vertical and lateral restraint of the pallet(s) positioned between the guide rails. Larger aircraft may have three or more guide rails, one each mounted near the port and starboard cabin walls with one or more centrals rail running along the center of the cabin floor.

The aircraft cargo handling system must also include a locking mechanism that is capable of locking the pallets in place longitudinally along the roller conveyor. In large aircraft, where there is space to move between the pallets, the locking mechanism may simply consist of a foot-operated cargo lock mounted to the floor of the aircraft between the roller conveyors. In smaller aircraft, such as military helicopters however, the locking mechanism typically must be situated in the very narrow confines between the guide rail and the cabin wall. Basic operation of the cargo system requires the pallets to be individually restrained and released sequentially front-to-back or back-to-front. The limited space available between the loaded pallets and the cabin wall makes it difficult to ascertain the locked or unlocked status of the individual cargo locks and also dictates that the locking and unlocking action be done from a remote location, where a human operator can fit.

U.S. Pat. No. 4,344,726 issued to Naffa discloses a cargo handling system including the right and left hand restraint rail assemblies having longitudinally spaced lock mechanisms which are positioned in the narrow space between the restraint rail assemblies and the cabin wall of a military helicopter. The lock mechanisms are capable of being sequentially locked and unlocked to provide longitudinal restraint of military 463L pallets. The cargo handling system of Naffa, however, is extraordinarily complex, consisting of multiple interconnected lock mechanisms, each of which includes dozens of moving springs, actuator rods, pivots, linkages, gear sectors, and other moving parts. What is needed is a cargo handling system having longitudinally spaced lock mechanisms that are capable of being sequentially locked and unlocked without the complexity and unreliability associated with the use of multiple interconnected lock mechanisms.

BRIEF DESCRIPTION OF THE INVENTION

The present invention comprises a cargo handling system that is capable of being sequentially locked and unlocked. According to an illustrative embodiment the cargo handling apparatus comprises a pair of load restraining rail assemblies. Each of the load restraining rail assemblies include a plurality of guide members each of which has a vertical inside surface and a horizontal lower surface that capture the side edges of the pallet being loaded onto the aircraft. Each of the load restraining rail assemblies further includes a shaft assembly running substantially parallel to the longitudinal axis of the aircraft, which in most instances is also parallel to the side edges of the pallets being loaded. The shaft assembly has a plurality of lock pawls, each of which comprises a body having a cylindrical pallet-engaging surface. The pallet engaging surfaces of the lock pawls have increasing included angles at stations moving toward the front of the aircraft (or vice versa). This enables a first pallet to be locked in position by rotating the shaft assembly a predetermined angular rotation which causes the largest of the lock pawls to engage. A second pallet can then be loaded and locked in position by rotating the shaft assembly an additional predetermined angular rotation which causes the second-largest of the lock pawls to engage. Third and subsequent pallets can be loaded and locked in position sequentially by rotating the shaft assembly an additional predetermined angular rotation each time. Unloading of the aircraft is carried out in the reverse order, by rotating the shaft assembly in the opposite direction in steps to unlock each pallet individually as the aircraft is unloaded.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
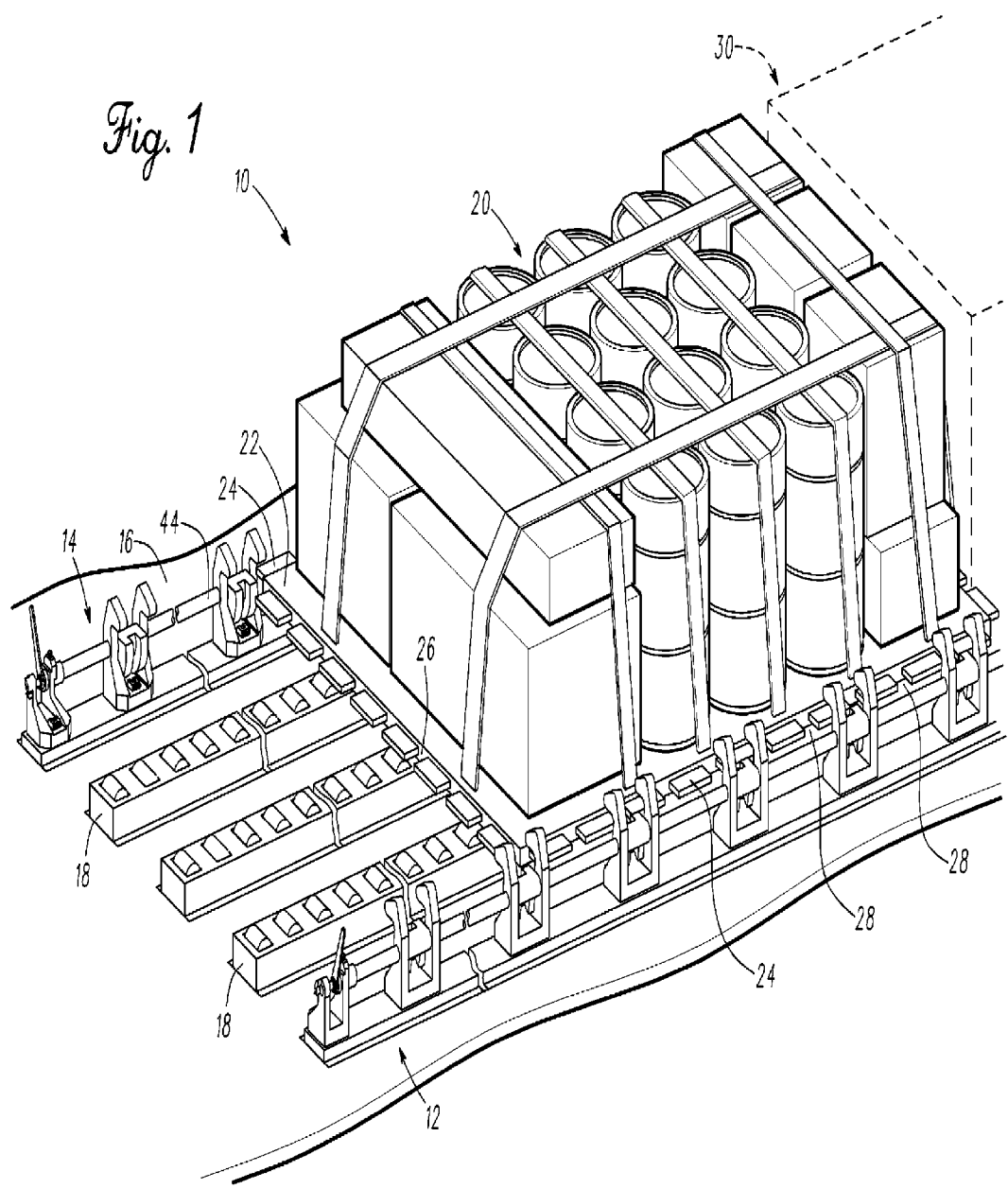
FIG. 1 is; is a top perspective view of a cargo handling apparatus incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

Figure 2:
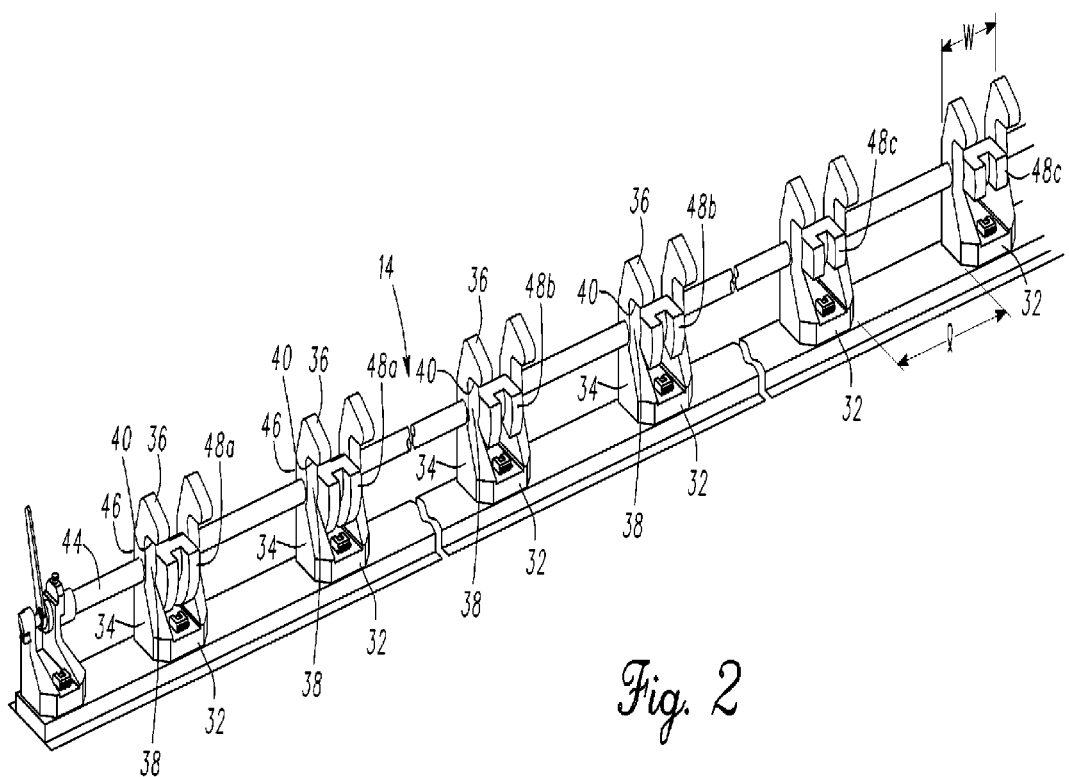
FIG. 2 is; a top perspective view of one of the load restraint rail assemblies of the cargo handling apparatus of FIG. 1.

With reference to FIGS. 1 and 2 as a cargo handling apparatus 10 incorporating features of the present invention comprises a port load restraining rail assembly 12 and a starboard load restraining rail assembly 14 each of which is attached to the aircraft floor 16. Cargo handling apparatus 10 further comprises a plurality of roller conveyors 18 which are adapted to permit a load 20 secured to a pallet 22 two move easily along the aircraft floor (for the purpose of depicting starboard load restraining rail assembly 14, pallet 22 is show aft of the fully-forward position it would normally occupy). Multiple additional pallets such as pallet 30 may be loaded onto cargo handling apparatus 10 behind pallet 22, up to the load capacity of the aircraft, each of which is guided into a parallel orientation with pallet 22 by the constraints of load restraining rail assemblies 12 and 14. In the illustrative embodiment, pallet 22 and the additional pallets are HCU-6/E ("463L") pallets having side edges 24, 26 with the series of evenly spaced recesses 28 all around, which is characteristic of the 463L pallet. Although in the illustrative embodiment, pallet 22 and the additional pallets comprise 463L pallets, the invention is not to be limited to 463L pallets and is considered to encompass any pallet that has "castellated" edges—(i.e. with regularly-spaced notches along the side rails). Port load restraining rail assembly 12 is identical in construction to starboard load restraining rail assembly 14. Accordingly, only starboard load restraining rail assembly 14 will be described in detail herein.

Figure 3:
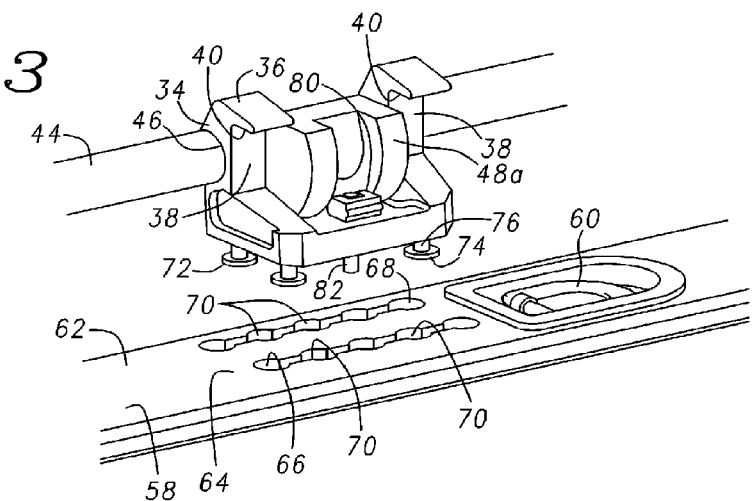
FIG. 3 is a top perspective view of an individual middle guide member and base plate of the load restraint rail assembly of FIG. 2.

With particular reference to FIGS. 2 and 3 load restraining rail assembly 14 comprises a plurality of intermediate guide members 32 each of which comprises a vertical web portion 34 and horizontal flange portion 36. The inside surface 38 of vertical web portion 34 and the lower surface 40 of horizontal flange portion 36 of intermediate guide member 32 form an inverted L-shaped guide that engages the side edge 24 of pallet 22 to provide lateral and vertical restraint of the pallet when loaded onto cargo handling apparatus 10. For reasons that will be explained more fully hereinafter, the width "w" of each of the intermediate guide member 32 is larger than the 2¾ inch width dimension of recesses 28 formed in pallet 22. The distance "e" between each of the intermediate guide members 32 is selected to be equal to (or a multiple of) the center-to-center distance between recesses 28 formed in the side edge 24 of pallet 22 so that horizontal flange portion 36 of intermediate guide member 32 engages side edge 24 of pallet 22 just outside of the recesses.

Figure 4:
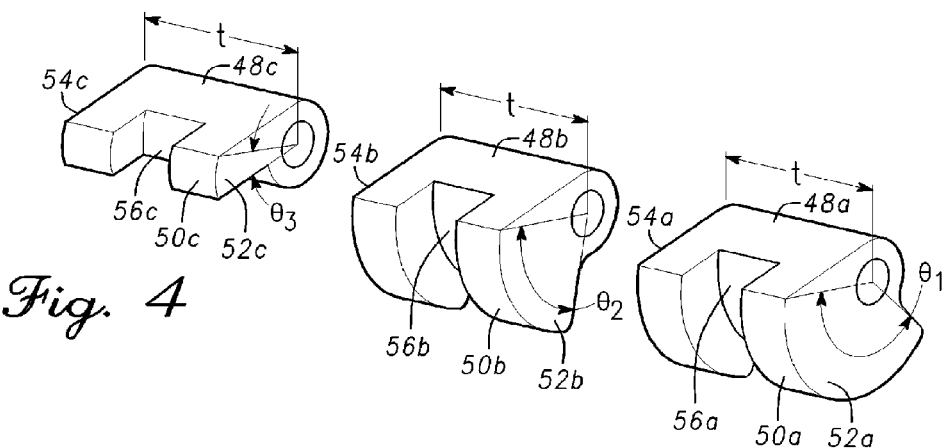
FIG. 4 is a top perspective view of a plurality of the lock pawls depicted in FIG. 2.

A shaft assembly 44 is supported for rotation by means of bores 46 formed in intermediate guide members 32. A plurality of lock pawls 48a, 48b, and 48c are rigidly attached to shaft assembly 44. With additional reference to FIG. 4, each of lock pawls 48a, 48b, and 48c comprise a body having a cylindrical pallet-engaging surface 50a, 50b and 50c each of which has an included angle $\Theta_a$, $\Theta_b$, and $\Theta_c$, respectively. As can be determined from an inspection of FIG. 4, the pallet engaging surface 50a of lock pawl 48a has a larger included angle than that of pallet engaging surface 50b of lock pawl 48b, and pallet engaging surface 50b of lock pawl 48b has a larger included angle than that of pallet engaging surface 50c of lock pawl 48c. Each of lock pawls 48a, 48b, and 48c have a thickness dimension "l" which is slightly less than the 2¾ inch width dimension of recesses 28 formed in pallet 22 so that when lock pawls 48a, 48b, and 48c are rotated into position, the lateral sides 52a, 54a, 52b, 54b and/or 52c, 54c of lock pawls 48a, 48b, and 48c, respectively, securely engage the edges of recesses 28 formed in pallet 22 to lock pallet 22 in position.

Figure 5:
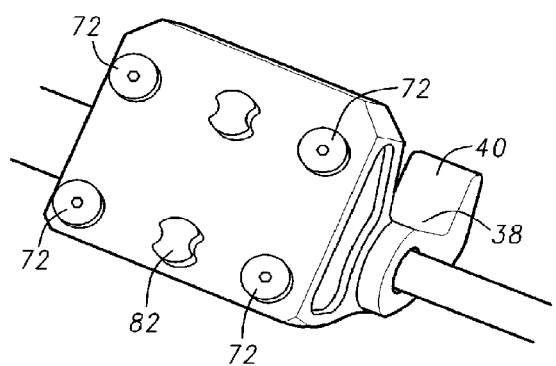
FIG. 5 is a bottom perspective view of the middle guide member of FIG. 3.

With reference to FIGS. 3 and 5, load restraining rail assembly 14 is mounted to a base plate 58 which enables load restraining rail assembly 14 to be quickly removed when the aircraft is being configured to carry non-palletized cargo. Base plate 58 itself is permanently or semi-permanently secured to the floor of the aircraft e.g. using rivets, threaded fasteners, welding, etc. and may include a plurality of load-rings 60 to enable the non-palletized cargo to be secured within the aircraft. The upper surface 62 includes a track mount 64 similar to the seat track found in many commercial aircraft. Track mount 64 comprises a pair of slots 66 and 68 formed in upper surface 62 of base plate 58. Slots 66 and 68 are both inverted T-shaped in cross-section and have a plurality of circular cutouts 70 spaced at regular intervals along slots 66 and 68.

Each of the intermediate guide members 32 have a plurality of feet 72 each of which comprises a substantially cylindrical head portion 74 and a substantially cylindrical shank portion 76. The head portion 74 of each of feet 72 has a diameter slightly less than the diameter of circular cutouts 70. The shank portion 76 of each of feet 72 has a diameter slightly less than the width dimension of slots 66 and 68. This enables feet 72 of the intermediate guide members 32 to be inserted through circular cutouts 70 into slots 66 and 68. Moving intermediate guide members 32 forward or backwards half the distance between circular cutouts 70 renders it impossible to remove intermediate guide members 32 from track mount 64. A spring-loaded lock plunger 76 snaps into one of circular cutouts 70 when the intermediate guide member 32 is moved to this position thus preventing intermediate guide member 32 from unintentionally moving out of the locked position.

Figure 6:
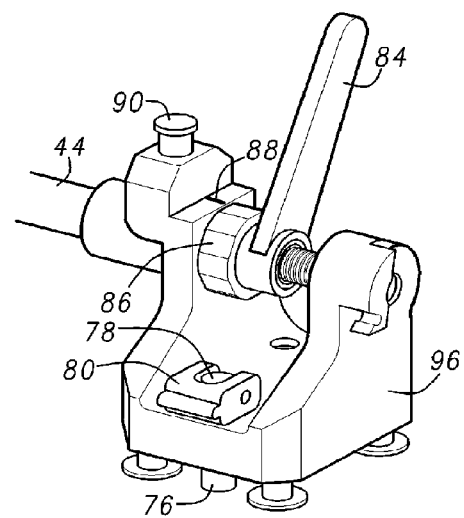
FIG. 6 is a top perspective view of the forward guide member of FIG. 2 with the shear plunger in the engaged position and the shaft rotation lock in the disengaged position.
Figure 7:
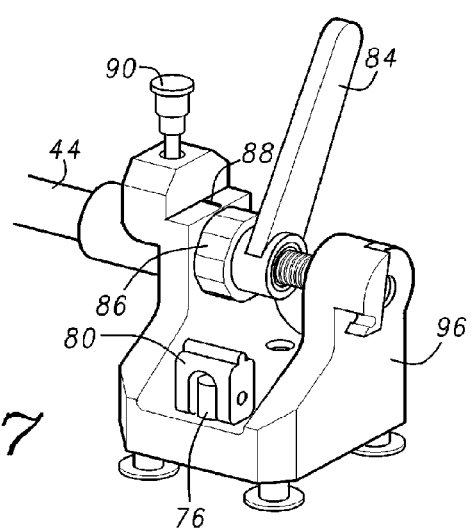
FIG. 7 is a top perspective view of the forward guide member of FIG. 2 with the shear plunger in the disengaged position and the shaft rotation lock in the engaged position.

With additional reference to FIGS. 6 and 7, the upper end 78 of lock plunger 76 is attached to a toggle 80 which enables lock plunger 76 to be withdrawn to enable load restraining rail assembly 14 to be removed. To withdraw lock plunger 76 from track mount 64, toggle 80 is simply rotated 90° from the engaged position shown in FIG. 6 to the disengaged position shown in FIG. 7. Because toggle 80 goes over-center, lock plunger 76 and remain disengaged until toggle 80 is rotated back into the engaged position as shown in FIG. 6. Because lock plunger 76 is spring-loaded, however, installation of load restraining assembly 14 does not require any manipulation of toggle 80 other than to ensure it is in the engaged position prior to installation. With reference again to FIG. 4, each of lock pawls 48a, 48b, and 48c includes a clearance groove 56a, 56b and 56c so that the lock pawls do not interfere with toggle 80 either in the disengaged or engaged position.

As can be determined from the foregoing, in operation, a pallet 22 is loaded onto the aircraft by moving the pallets along roller conveyors 18 until pallet 22 is in the appropriate (e.g. forwardmost) position. Pallet 22 is then locked in place by rotating shaft assembly 44 a predetermined angular distance until lock pawls 48a engage corresponding recesses 28 in side edges 24 of pallet 22, but lock pawls 48b and 48c do not obstruct the region between inside surface 38 and lower surface 40 of intermediate guide member 32. This enables an additional pallet 30 to be loaded onto the aircraft by moving the pallet along roller conveyors 18 until additional pallet 30 is in the appropriate (e.g. second forwardmost) position immediately behind and parallel to a pallet 22. Additional pallet 30 is then locked in position by rotating shaft assembly 44 a predetermined additional angular distance until lock pawls 48b engage corresponding recesses 28 in side edges 24 of pallet 22 but lock pawls 48c still have not rotated a sufficient distance to obstruct the region between inside surface 38 and lower surface 40 of intermediate guide member 32. (Lock pawls 48a continue to rotate with shaft assembly 44, but because of their larger included angle $\Theta_a$ lock pawls 48a do not disengage from pallet 22.) The foregoing process is repeated, each time advancing shaft assembly 44 an additional predetermined angular distance to engage the next set of lock pawls so that each pallet is loaded and locked in place sequentially as the aircraft is loaded. Unloading of the aircraft is carried out in the reverse order, rotating shaft assembly 44 in the opposite direction in steps to unlock each pallet individually as the aircraft is unloaded.

With additional reference to FIGS. 6 and 7, in the illustrative embodiment, load restraining rail assembly 14 further includes a forward guide member 96 which supports control lever 84 enabling manual operation of load restraining rail assembly 14. Control lever 84 operatively attached to shaft assembly 44 to enable shaft assembly 44 to be rotated by hand. A status indicator dial 86 is also operatively attached to shaft assembly 44 and cooperates with a pointer 88 to provide the operator with a visual indication of the locked or unlocked status of each sequential pallet. A shaft lock 90 is also provided to lock shaft assembly 44 in position after each sequential rotation. In the illustrative embodiment, shaft lock 90 comprises a spring-loaded plunger which engages a plurality of counterbores cross-drilled in shaft assembly 44. In order to rotate shaft assembly 44, the user grasps shaft lock 90 and pulls upward to withdraw shaft lock 90 from the corresponding counterbore in shaft assembly 44. Shaft lock 90 can be released at an intermediate position after which it will snap into and lock shaft assembly 44 at the next sequential position. Although control lever 84 in the illustrative embodiment is a rigid handle, other means of rotating shaft assembly 44 are within the scope of the invention, including use of a removable handle that attaches to a hex or other keyed surface extending from shaft assembly 44, a handle that folds axially against shaft assembly, 44 or a power rotary actuator. Similarly, although shaft lock 90 in the illustrative embodiment is a spring loaded plunger that moves radially with respect to the axis of shaft assembly 44, a locking plunger that moves axially to engage a locking disk attached to shaft assembly 44 is also within the scope of the invention.

Figure 8:
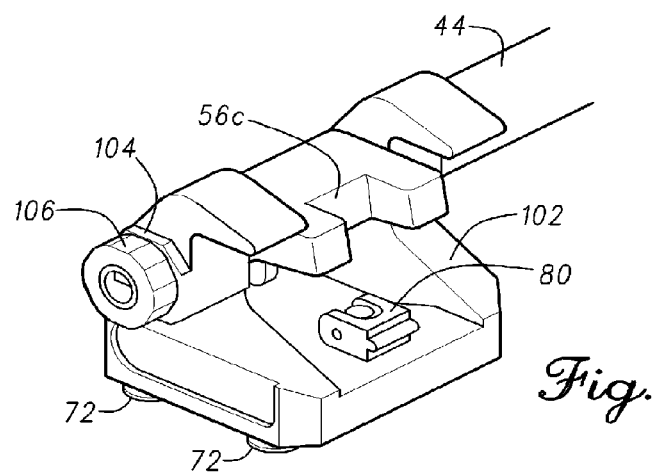
FIG. 8 is a top perspective view of the aft end guide member FIG. 2.

With reference to FIG. 8, in the illustrative embodiment, load restraining rail assembly 14 further includes an aft guide member 102, which is identical in construction to intermediate guide member's 32 with the exception of the inclusion of a pointer 104 which cooperates with indicator dial 106 to provide the crewmembers with a visual indication of the locked or unlocked status of each sequential pallet being loaded.

Although certain illustrative embodiments and methods have been disclosed herein, it will be apparent from the foregoing disclosure to those skilled in the art that variations and modifications of such embodiments and methods may be made without departing from the invention. For example, although in the illustrative embodiment, shaft assembly 44 comprises a solid shaft, an articulated shaft (e.g. with universal joints) or other flexible shaft is considered within the scope of the invention. Additionally, although in the illustrative embodiment, only two each of three different lock pawls are shown, more or less than two lock pawls-per-pallet and more than three different lock pawls are considered within the scope of the invention. Accordingly, it is intended that the invention should be limited only to the extent required by the appended claims and the rules and principles of applicable law. Additionally, as used herein, references to direction such as "up" or "down" are intend to be exemplary and are not considered as limiting the invention and, unless otherwise specifically defined, the terms "substantially" or "approximately" when used with mathematical concepts or measurements mean within ±10 degrees of angle or within 10 percent of the measurement, whichever is greater.

What is claimed is:

1. Cargo handling apparatus for restraining a plurality of pallets aboard an aircraft, each of said plurality of pallets having a side edge with a plurality of recesses formed therein, said cargo handling apparatus comprising:
   a plurality of lateral restraint members attached to a floor section of said aircraft, each of said plurality of lateral restraint members comprising a body having a lateral surface and an upper surface, said lateral surface and said upper surface engaging the side edge of one of said pallets adjacent to one of said recesses for restraining lateral and vertical motion of said pallet;
   a shaft assembly supported by said plurality of lateral restraint members for rotation about a rotation axis substantially parallel to a longitudinal axis of said aircraft;
   first and second lock pawls attached to said shaft assembly, each of said first and second lock pawls comprising a body having a pallet-engaging surface comprising a substantially cylindrical segment having a center that is coaxial with the rotation axis of said shaft assembly and a predetermined included angle, the included angle of said first lock paw being larger than the included angle of said second lock pawl.

2. The cargo handling apparatus of claim 1, wherein: said shaft assembly is rotatable for sequentially engaging said first and second lock pawls with one of said plurality of recesses.

* * * * *